United States Patent
Komiya

(10) Patent No.: US 9,185,642 B2
(45) Date of Patent: Nov. 10, 2015

(54) PORTABLE TELEPHONE, COMMUNICATION CONNECTION CONTROL METHOD, AND PROGRAM

(75) Inventor: Yoshinori Komiya, Saitama (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/346,548

(22) PCT Filed: Aug. 8, 2012

(86) PCT No.: PCT/JP2012/005033
§ 371 (c)(1),
(2), (4) Date: Mar. 21, 2014

(87) PCT Pub. No.: WO2013/042302
PCT Pub. Date: Mar. 28, 2013

(65) Prior Publication Data
US 2014/0228023 A1    Aug. 14, 2014

(30) Foreign Application Priority Data
Sep. 22, 2011 (JP) ................. 2011-206771

(51) Int. Cl.
*H04W 4/00* (2009.01)
*H04W 48/18* (2009.01)
(Continued)

(52) U.S. Cl.
CPC .......... *H04W 48/18* (2013.01); *H04M 15/8038* (2013.01); *H04M 15/8088* (2013.01); *H04M 15/83* (2013.01); *H04M 15/851* (2013.01); *H04M 15/8044* (2013.01); *H04W 4/24* (2013.01)

(58) Field of Classification Search
CPC .............. G06Q 30/02; G06Q 30/0261; G06Q 30/0269; G06Q 20/32; G06Q 30/0267; G06Q 30/0255; G06Q 30/0256; G06Q 20/3224; G06Q 20/3226; G06Q 20/3674; G06Q 30/0257; G06Q 30/0611; G06Q 30/0639
USPC ..................................... 455/435.2
See application file for complete search history.

(56) References Cited

U.S. PATENT DOCUMENTS 6,516,190 B1 * 2/2003 Linkola .................. 455/408
7,209,735 B2   4/2007 Sato
(Continued)

FOREIGN PATENT DOCUMENTS

| EP | 1239690 | 9/2002 |
| EP | 2352098 | 8/2011 |

(Continued)

OTHER PUBLICATIONS

International Search Report corresponding to International Application No. PCT/JP2012/005033, Sep. 18, 2012, 4 pages.
(Continued)

*Primary Examiner* — Kwasi Karikari
(74) *Attorney, Agent, or Firm* — Wilmer Cutler Pickering Hale and Dorr LLP

(57) ABSTRACT

A portable telephone equipped with a communication section used for communication inside and outside a country that includes an acquisition section configured to acquire information on a communications company that can be connected at the time of connection to a base station, a judgment section judges whether or not the acquired information on the communications company indicates a communications company for which flat-rate data communication is accessible, and a connection control section performs connection by the communication section to the communications company indicated by the acquired information on the communications company and sets that flat-rate data communication is accessible when judged YES by the judgment section, and conversely performs connection by the communication section to the communications company indicated by the acquired communications company information and sets that flat-rate data communication is not accessible when judged NO by judgment section.

7 Claims, 4 Drawing Sheets

(51) Int. Cl.
*H04M 15/00* (2006.01)
*H04W 4/24* (2009.01)

(56) References Cited

U.S. PATENT DOCUMENTS

| | | | |
|---|---|---|---|
| 8,615,558 | B2 | 12/2013 | Fukuzato |
| 8,634,828 | B2 | 1/2014 | Shi et al. |
| 2002/0123333 | A1 | 9/2002 | Sato |
| 2002/0154632 | A1* | 10/2002 | Wang et al. ............ 370/389 |
| 2008/0020773 | A1* | 1/2008 | Black et al. ............ 455/445 |
| 2010/0062808 | A1 | 3/2010 | Cha et al. |
| 2010/0311444 | A1 | 12/2010 | Shi et al. |
| 2011/0219092 | A1 | 9/2011 | Fukuzato |
| 2013/0023235 | A1* | 1/2013 | Fan et al. .................. 455/411 |

FOREIGN PATENT DOCUMENTS

| | | |
|---|---|---|
| JP | 2002-159043 | 5/2002 |
| JP | 2002-262358 | 9/2002 |
| JP | 2009-044656 | 2/2009 |
| JP | 2010-062771 | 3/2010 |
| WO | WO-2010/027765 A2 | 3/2010 |
| WO | WO-2010/061783 | 6/2010 |

OTHER PUBLICATIONS

Extended European Search Report issued by the European Patent Office for Application No. 12833797.9 dated Apr. 8, 2015 (8 pages).

* cited by examiner

PORTABLE TELEPHONE, COMMUNICATION CONNECTION CONTROL METHOD, AND PROGRAM

CROSS-REFERENCE TO RELATED APPLICATIONS

This application is a national stage application of International Application No. PCT/JP2012/005033 entitled "Portable Telephone, Communication Connection Control Method, and Program," filed on Aug. 8, 2012, which claims the benefit of the priority of Japanese patent application No. 2011-206771, filed on Sep. 22, 2011, the disclosures of each of which are hereby incorporated by reference in their entirety.

TECHNICAL FIELD

The present invention relates to a portable telephone, a communication connection control method, and a program.

BACKGROUND ART

In Japan, with a flat rate of a data communication charge and an increase in a smartphone that can use the Internet and various applications, a data communication amount per a person has increased. In addition, many of smartphones and portable telephones each of which has an internet connection function have been able to be used as they are in a foreign country by roaming service, thereby being very convenient. On arrival at the foreign country, automatic connection to a communications company for which roaming can be performed is performed just by applying power to the portable telephone, so that a user can use the portable telephone without being aware of such as selection of a communications company.

On the other hand of such convenience, the charge at the roaming at the foreign country is different from the charge of that in the domestic country, so that it has tended that the call charge and data communication the charge become relatively high. Therefore, when the portable telephone is used in the foreign country, the user needs to pay attention so as to judge whether a communications company to which the portable telephone is connected corresponds to flat-rate service, and it is probable that a high fee is charged later if the user uses the portable telephone as usual without notice.

Due to such a background, in some communications companies, there is a function to notify the user of a message that "the charge becomes relatively high for a call and data communication at the foreign country" when connection to a roaming destination is performed on arrival at the foreign country.

Because such a function is used only to alert the user, it is impossible to avoid occurrence of the relatively high charge due to unilateral incoming call and a mail to be received from a counter party even when the user wants to try to avoid the usage at the foreign country as much as possible. In the case of a telephone, there is no problem as long as the traveler notes the usage because the counter party disconnects incoming call if the user does not reply to the incoming call for a certain period of time, however, in the case of mail reception, a communication amount the charge of which is relatively high occurs even when the user notes the data communication because the data communication is performed forcibly.

The user can also set the portable telephone so that a mail is forced not to be received at the foreign country before leaving the domestic country, however, it is conceivable that the user travels abroad while the user forgets to perform the setting.

In addition, in a smartphone, which has been prevalent in recent years, there are many cases in which an installed application periodically performs data communication and the data communication is performed independently of the intention of the user.

In a smartphone in which various applications are allowed to be installed, it is difficult for the user to grasp an application that periodically performs data communication, and it is not realistic that setting of each application is changed, and there is also an application in which change to setting that communication is not performed is not allowed.

In order to avoid the data communication that is forcibly performed independently of the intention of the user as described above, the data communication is needed to be set to OFF immediately after the power of the portable telephone is turned on when the user arrives at the foreign country. Generally, in the portable telephone and the smartphone, a function to set the data communication to OFF is included, and when the data communication is set to OFF, data communication through a GSM (Global System for Mobile Communications), and a W-CDMA (Wideband Code Division Multiple Access) network, or the like cannot be performed, however, a call and data communication through Wi-Fi (Wireless fidelity) can be performed.

However, if it takes a long time to perform the setting after the power is applied, it is well possible that mail reception and data communication by an application are performed during that time. Therefore, in order to eliminate the burden of setting and remember to set the data communication to OFF, there is conceived a method of automatically changing the setting on the portable telephone side when it is detected that the user is in the foreign country.

For example, in Patent Documents 1 and 2, there has been discussed a technology of using an identification code of a country that is transmitted from a base station, a GPS (Global Positioning System) signal, and the like as a method by which a portable telephone automatically recognizes that the user is in the foreign country and setting of the portable telephone is automatically changed.

PRIOR ART DOCUMENTS

Patent Documents

Patent Document 1: JP 2009-044656
Patent Document 2: JP 2002-159043

SUMMARY OF INVENTION

Problem to be Solved by the Invention

However, in a case in which data communication is automatically set to OFF using the methods that have been discussed in patent documents 1 and 2, there is no problem when a user who can receive flat-rate service only in the domestic country travels abroad, however, a user who makes a contract by which the user can receive service of flat-rate data communication even for a roaming destination cannot receive the service of flat-rate data communication, thereby being inconvenient.

In addition, there is a case in which a plurality of communications companies exist even in a single country, and roaming can be performed for all of the communications companies, however flat-rate data communication can be performed only for one of the communications companies, so that there is a possibility that roaming connection of the portable telephone is performed for a communications company for which flat-rate data communication is not allowed to be performed, and that is a problem that is not solved by the above-described generally-known technology. Such a problem also occurs in an environment in which various countries such as Europe countries are adjacent to each other and people frequently go and come.

Therefore, an object of the present invention is to provide a portable telephone that can achieve roaming connection for which a communication charge is suppressed inside and outside a country, a communication connection control method, and a program.

Means for Solving the Problem

A portable telephone according to the present invention is a portable telephone that can switch a communications company that is used for communication by a communication section inside and outside a country, and includes an acquisition section configured to acquire information on a communications company that can be connected at a time of connection to a base station, a judgment section configured to judge whether or not the communications company information that is acquired by the acquisition section indicates a communications company for which flat-rate data communication can be performed, and connection control section configured to perform connection, by the communication section, to the communications company that is indicated by the communications company information that is acquired by the acquisition section and set that data communication can be performed when the judgment section judges that the communications company information indicates the communications company for which flat-rate data communication can be performed, and perform connection, by the communication section, to the communications company that is indicated by the communications company information that is acquired by the acquisition section and set that data communication is not allowed to be performed when the judgment section judges that the communications company information does not indicate the communications company for which flat-rate data communication can be performed.

A communication connection control method according to the present invention is a communication connection control method when a communications company that is used for communication by a communication section inside and outside a country is switched and includes an acquisition step of acquiring information on a communications company that can be connected at a time of connection to a base station, a judgment step of judging whether or not the acquired communications company information indicates a communications company for which flat-rate data communication can be performed, and a connection control step of performing connection, by the communication section, to the communications company that is indicated by the acquired communications company information and setting that data communication can be performed when it is judged that the communications company information indicates the communications company for which flat-rate data communication can be performed, in the judgment step, and performing connection, by the communication section, to the communications company that is indicated by the acquired communications company information and setting that data communication is not allowed to be performed when it is judged that the communications company information does not indicate the communications company for which flat-rate data communication can be performed, in the judgment step.

A non-transitory computer-readable storage medium having a program stored thereon, according to the present invention, that is executable by a computer of a portable telephone which switches a communications company that is used for communication by a communication section inside and outside a country to perform functions comprising: an acquisition function to acquire information on a communications company that can be connected at a time of connection to a base station, a judgment function to judge whether or not the acquired communications company information indicates a communications company for which flat-rate data communication can be performed, and a connection control function to perform connection, by the communication section, to the communications company that is indicated by the acquired communications company information and set that data communication can be performed when the judgment function judges that the communications company information indicates the communications company for which flat-rate data communication can be performed, and perform connection, by the communication section, to the communications company that is indicated by the communications company information that is acquired by the acquisition function and set that data communication is not allowed to be performed when the judgment function judges that the communications company information does not indicate the communications company for which flat-rate data communication can be performed.

Effect of the Invention

According to the invention, roaming connection for which a communication charge is suppressed inside and outside a country can be achieved.

DESCRIPTION OF EMBODIMENTS

In the present invention, in international roaming of a portable telephone that is compatible with a communication scheme such as a GSM and W-CDMA, the charge of a communication fee due to data communication that is independent of the intention of a user is avoided when connection to a roaming destination for which flat-rate data communication service is not applied is performed.

The embodiments of the present invention are described below with reference to drawings.

In the embodiments, a list of communications companies for which flat-rate data communication can be performed is created in accordance with contents of a contract that the user has made, and connection to a communications company for which flat-rate data communication can be performed in the list is preferentially performed when the portable telephone searches for a connection destination. When there is no choice but to perform connection to a company other than the communications company for which flat-rate data communication can be performed, the connection is performed after data communication is automatically set to OFF.

Note that the above-described data communication of ON/OFF includes data communication through a line such as a GSM network and a W-CDMA network, or Wi-Fi, Bluetooth (registered trademark).

Figure 1:
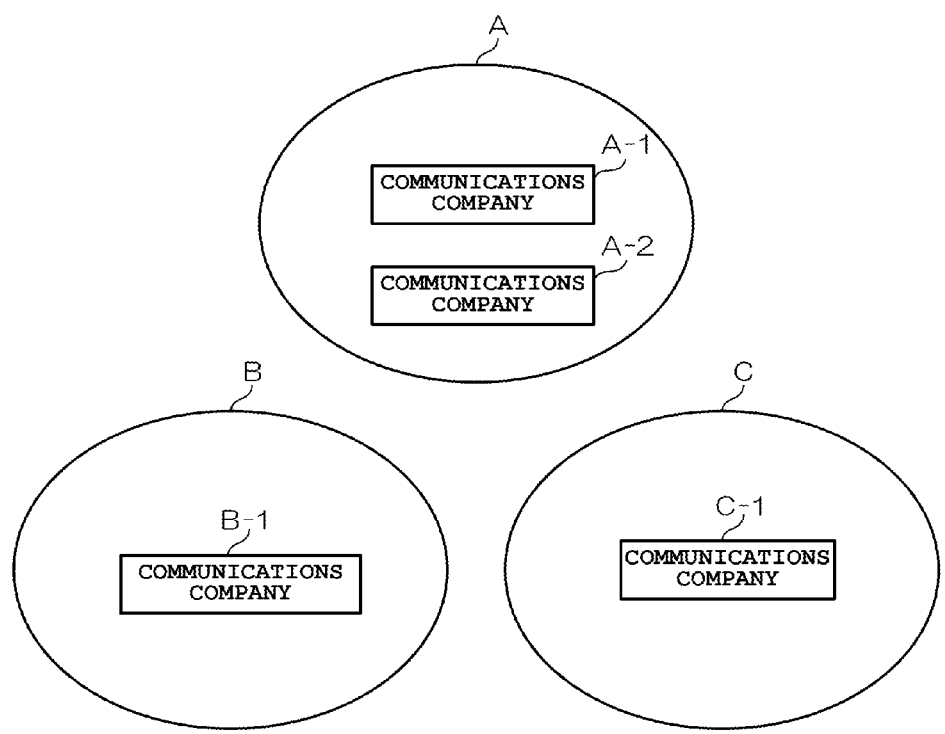
FIG. 1 is a block diagram illustrating a configuration of a communication system according to an embodiment of the present invention.

FIG. 1 is a block diagram illustrating a configuration of a communication system according to an embodiment of the present invention, In FIG. 1, examples of three countries of a country A, a country B, and a country C, and communications companies A-1, A-2, B-1, and C-1 that exist in the countries are illustrated. In the country A, there are two companies of the communications company A-1 and the communications company A-2, and in the country B, there is a single company of the communications company B-1, and in the country C, there is a single company of the communications company C-1.

Figure 2:
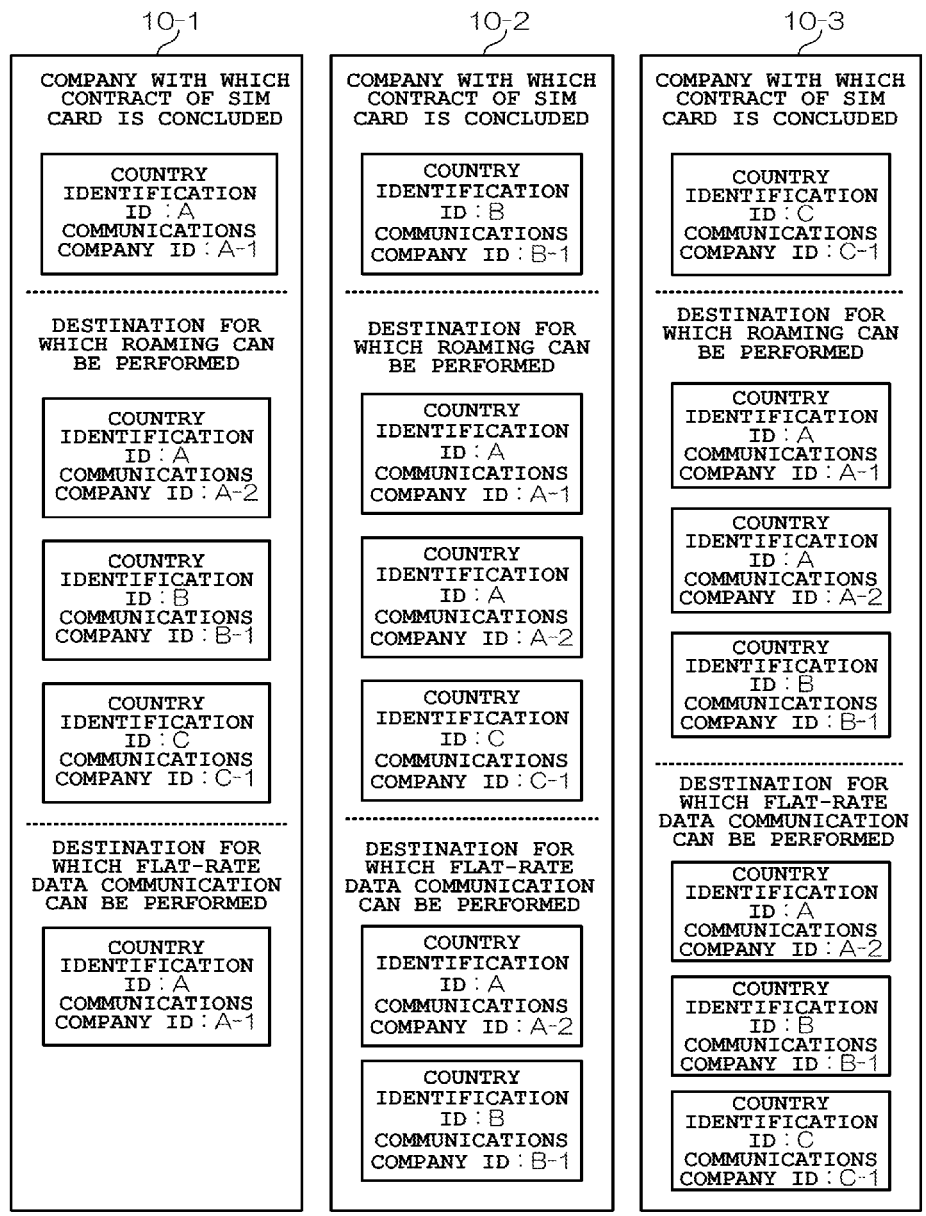
FIG. 2 is a schematic diagram illustrating an example of three types of SIM (SIM card, Subscriber Identity Module Card) card that is used in a portable telephone according to the embodiment.

Specific contents and a storage destination of a list are described below. FIG. 2 is a schematic diagram illustrating an example of three types of SIM cards that are used in a portable telephone according to the embodiment. In a SIM card, a list of country identification IDs and communications company IDs of connection destinations for which roaming connection can be performed and a list of country identification IDs and communications company IDs of destination for which flat-rate data communication can be performed are stored in addition to a country identification ID and communications company ID of a communications company with which a contract of the SIM card is made. The country identification ID and the communications company ID correspond to information that is defined in 3GPP.

In FIG. 2, a SIM card 10-1 is a card that stores that a contract is made with the communications company A-1 of the country A, roaming communication can be performed for the communications company A-2 of the country A, the communications company B-1 of the country B, and the communications company C-1 of the country C, and flat-rate data communication can be performed only for the communications company A-1. A SIM card 10-2 is a card stores that a contract is made with the communications company B-1 of the country B, roaming communication can be performed for the communications companies A-1 and A-2 of the country A and the communications company C-1 of the country C, and flat-rate data communication service can be performed for the communications company A-2 of the country A and the communications company B-1 of the country B. A SIM card 10-3 is a card that stores that a contract is made with the communications company C-1 of the country C, roaming communication can be performed for the communications companies A-1 and A-2 of the country A and the communications company B-1 of the country B and the communications company C-1 of the country C, and flat-rate data communication service can be provided for the communications company A-2 of the country A and the communications company B-1 of the country B.

The portable telephone includes a function to allow verbal communication and data communication to be performed in any one of the communications companies A-1, A-2, B-1, and C-1. In addition, roaming can be performed between the communications companies A-1, A-2, B-1, and C-1 using any one of the SIM cards 10-1, 10-2, and 10-3.

Note that a method of storing a list in the SIM cards 10-1 to 10-3 can be changed at the time of conclusion of a contract with a communications company and during the contract, however, the method is not limited. By inserting each of the three types of cards into a SIM card slot that is provided in a portable telephone of the second generation or the third generation, communication service of each of the communications companies can be received.

The portable telephone into which any one of the SIM cards 10-1 to 10-3 is inserted searches for a country identification ID and a communications company ID that match with the list of the SIM card when the portable telephone is connected to a base station of a communications company, sets data communication to ON and starts the connection when there is a base station of a communications company for which flat-rate data communication can be performed, and is connected to a base station of a communications company for which roaming connection can be performed and automatically sets data communication to OFF when there is no country identification ID and communications company ID that match with the list of the SIM card.

However, depending on circumstances, there is a case in which continuation of data communication is needed even when the portable telephone is outside the scope of flat-rate data communication. Therefore, in the embodiment, it can be set whether or not data communication can be continued for each communications company for which roaming connection can be performed.

An operation of the above-described embodiment is described below. Note that, hereinafter, the SIM cards 10-1 to 10-3 are collectively referred to a SIM card 10.

Figure 3:
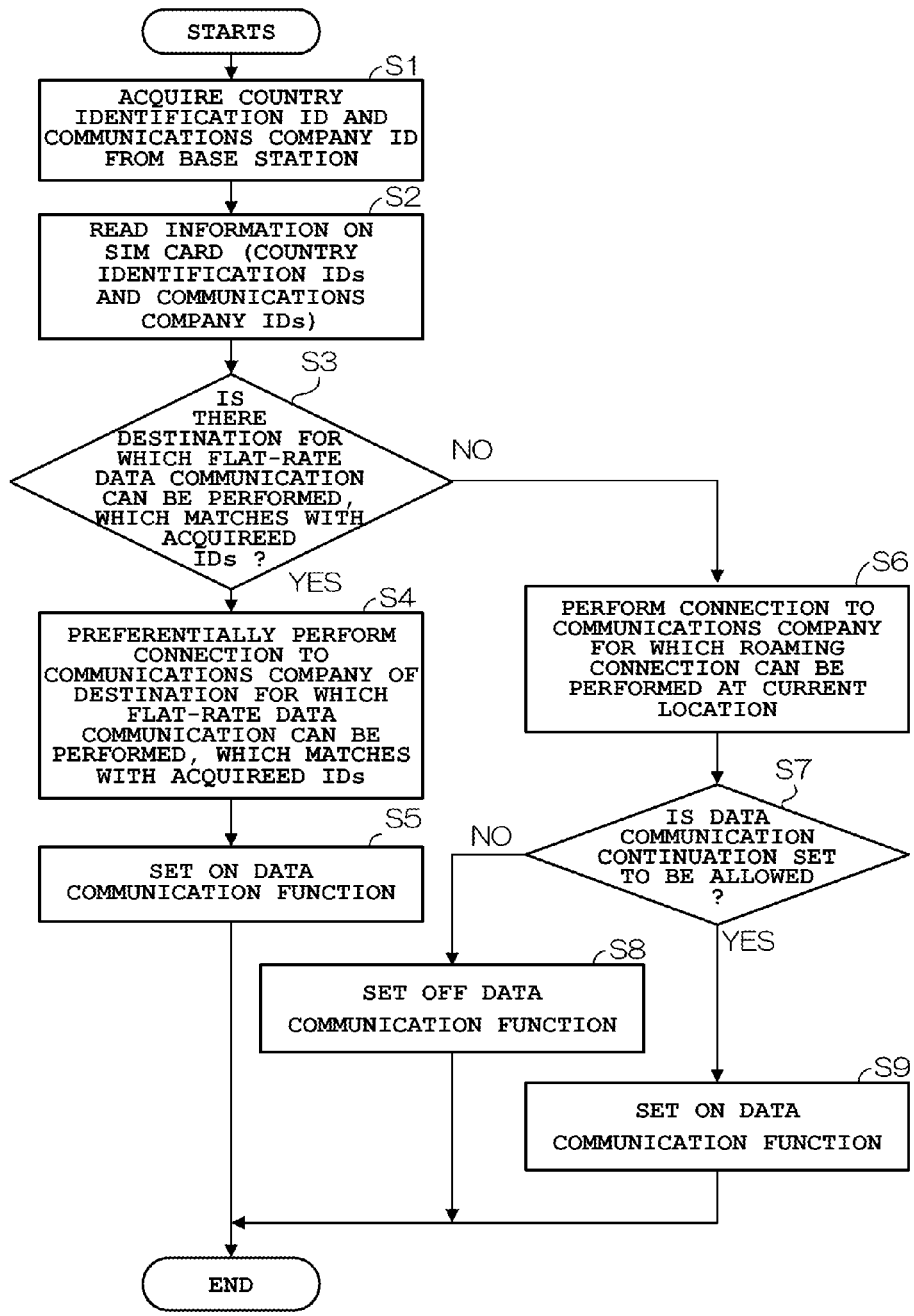
FIG. 3 is a flowchart illustrating an operation of the portable telephone according to the embodiment.

FIG. 3 is a flowchart illustrating an operation of the portable telephone according to the embodiment. When power is applied, the portable telephone into which a SIM card is inserted acquires a country identification ID and a communications company ID from an adjacent base station (Step S1). After that, information of the SIM card 10 (list of at least country identification IDs and communications company IDs of a company with which a contract of the SIM card 10 is made, a destination for which roaming can be performed, and a destination for which flat-rate data communication can be performed, which are illustrated in FIG. 2 in the embodiment) is read (Step S2).

After that, it is judged whether or not there is a destination for which flat-rate data communication can be performed and that matches with the country identification ID and the communications company ID that are acquired from the base station (Step S3). Note that, in the embodiment, flat-rate data communication can be performed for the communications company with which the contract is made, however, a different case may be assumed. In this case, first, it is judged whether or not the country identification ID and the communications company ID that are acquired from the base station respectively match with a country identification ID and a communications company ID of a communications company with which a contract is made, and connection to the communications company with which the contract is made may be performed as is when they are matched with each other. When they are not matched with each other, as above-described in Step S3, first, it may be judged whether or not there is a destination for which flat-rate data communication can be performed and that matches with the IDs that are acquired from the base station.

After that, when there is a destination for which flat-rate data communication can be performed and that matches with the IDs (YES in Step S3), connection to a communications company of the matched destination for which flat-rate data communication can be performed is preferentially performed (Step S4), a data communication function is set to ON (Step S5), and the processing ends.

On the other hand, when there is no matched destination for which flat-rate data communication can be performed (NO in Step S3), the information (information on a destination for which roaming can be performed) that is read from the SIM card 10 is referred to, and connection to the communications company for which roaming connection can be performed is performed (Step S6). After that, it is judged whether or not data communication continuation of the connected communications company for which roaming connection can be performed is set to "be allowed" (Step S7).

After that, when data communication continuation of the connected communications company for which roaming connection can be performed is not set to "be allowed" (NO in Step S7), the data communication function is set to OFF (Step S8), and the processing ends. On the other hand, when data communication continuation of the connected communications company for which roaming connection can be performed is set to "be allowed" (YES in Step S7), the data communication function is set to ON (Step S9), and the processing ends.

A specific example using the SIM card illustrated in FIG. 2 is described below.

A. Case in which the SIM Card 10-1 is Used

First, an example of the portable telephone into which the SIM card 10-1 is inserted is described. The SIM card 10-1 is a card that is provided by the communications company A-1 of the country A, and for the card, a contract in which flat-rate data communication is performed is made only with the communications company A-1.

A1. Case in which the SIM Card 10-1 is Used in the Country A

In the country A, when the SIM card 10-1 is inserted into the portable telephone, and the power is applied, there becomes in an environment in which only the country A as a country identification ID and both of the communications companies A-1 and A-2 as a communications company ID are recognized. The portable telephone reads a country identification ID and a communications company ID of a card issuer, which are recorded in the SIM card 10-1 and judges whether or not matching with the IDs that are currently being recognized. The country identification ID that is recorded in the SIM card 10-1 corresponds to the country A, and the communications company ID that is recorded in the SIM card 10-1 corresponds to the communications company A-1, so that connection to the matched communications company A-1 is performed preferentially. After that, the portable telephone sets the data communication function to ON.

A2. Case in which the SIM Card 10-1 is Used in the Country B (or the country C)

In the case in which the card is used in the country B, the portable telephone can accept only the country B as a country identification ID and the communications company B-1 as a communications company ID. The communications company A-1 allows roaming to be performed for the communications company B-1, so that the portable telephone into which the SIM card 10-1 is inserted can be used so as to be connected to the communications company B-1. Similar to the above-described example, after power is applied, it is judged whether or not the country identification ID and the communications company ID match with the contents that are recorded in the SIM card 10-1, however, they are not matched with each other herein. Therefore, after the connection to the communications company B-1 for which roaming can be performed is performed, the portable telephone sets the data communication function to OFF (in a state in which verbal communication can be performed).

Note that setting by which the data communication function is automatically set to OFF, when connection to a communications company with which the contract of flat-rate data communication is not made is performed, can be arbitrarily changed by the user, and for example, as described above, by setting data communication continuation to "be allowed", data communication may be performed even when connection to a communications company with which the contract of flat-rate data communication is not made is performed. In addition, even in a case in which data communication is automatically set to OFF, when the user performs the setting on the portable telephone side afterward, the data communication may be performed. Note that the similar case is applied even to the case in which the SIM card 10-1 is used in the country C.

A3. Case in which the SIM card 10-1 moves from the country A to the country B When the portable telephone is not allowed to be connected to the communications company ID: A-2 of the country identification ID: A by moving from the country A to the country B, the connection is switched to the communications company ID: B-1 of the country identification ID: B, which is recorded as a destination for which roaming can be performed. At the time of switching, the information that is recorded to the SIM card 10-1 is read, however, flat-rate data communication is not allowed to be performed for the communications company B-1, so that the portable telephone sets data communication to OFF immediately. If data communication is being performed at that time, the data communication is disconnected.

However, even when connection to a communications company that is not recorded as a destination for which flat-rate data communication can be performed is performed, as described above, data communication continuation may be set to "be allowed" in order to continue the data communication. In this case, the data communication is not disconnected even when the portable telephone crosses a border between the countries, however the portable telephone is outside the scope of flat-rate data communication at the time of switching to the communications company B-1.

B. Case in which the SIM Card 10-2 is Used

An example of the portable telephone into which the SIM card 10-2 is inserted is described below. The SIM card 10-2 is a card that is provided by the communications company B-1, and for the card, a contract in which flat-rate data communication is performed is made with the communications company B-1 and the communications company A-2.

B1. Case in which the SIM Card 10-2 is Used in the Country A

In the SIM card 10-2, it is recorded that flat-rate data communication can be performed in the communications company A-2 of the country A, so that connection to the communications company A-2 that corresponds to A-2 as a communications company ID is preferentially performed in the country A, so that the data communication function is set to ON.

When radio waves of the communications company A-2 do not reach the portable telephone, and only radio waves of the communications company A-1 can be received, connection to the communications company A-1 that is recorded as a destination for which roaming can be performed is performed, and the data communication function is set to OFF at that time. However, even in a case in which connection to a communications company that is not recorded as a destination for which flat-rate data communication can be performed is performed, when the data communication continuation is set to "be allowed" as described above in order to continue the data communication, the data communication can be continued.

B2. Case in which the SIM Card 10-1 or 10-2 is Used in the Country C

In the SIM cards 10-1 and 10-2, flat-rate data communication is not allowed to be performed for the communications company C-1 of the country C. Therefore, when the portable telephone into which any one of the SIM cards 10-1 and 10-2 is inserted is used in the country C, connection to the communications company C-1 that is a destination for which roaming can be performed is performed, and the data communication function is automatically set to OFF (in a state in which verbal communication can be performed).

However, even in this case, in order to continue the data communication, as described above, the data communication continuation is set to "be allowed", or setting on the portable telephone side is changed, so that the user can deliberately set the data communication function to ON.

B3. Case in which the SIM card 10-2 moves from the country A to the country B When the country A and the country B are adjacent to each other, and the portable telephone moves between the countries, the portable telephone becomes in a state in which the portable telephone cannot be connected to the communications company ID: A-2 of the country identification ID: A, to which the portable telephone has been previously connected in the country A, and can be connected only with the communications company ID: B-1 of the country identification ID: B, so that the connection is switched to the communications company B-1 with which the contract is made. In this case, flat-rate data communication can be performed in the communications company B-1, so that the data communication is performed continuously.

Note that, in the above-described embodiment, a list is created for each company with which a contract is made, destination for which roaming can be performed, and destination for which flat-rate data communication can be performed, and as a modification, sorting is performed in search order in a single list, and availability of flat-rate data communication may be judged as follows.

(1) The availability of flat-rate data communication is managed by flags and judged by seeing the state each time.

(2) A boundary of availability of flat-rate data communication (dummy item, null at the end of data that indicates a final item in available data, and the like) is set, and data communication is not allowed to be performed when the portable telephone crosses the boundary and connection is performed using a list on the unavailable side.

In addition, the above-described embodiment can be applied to a case in which handover by which a base station is switched one after another while the portable telephone moves in the domestic country in addition to the case of connection to a base station when the power is normally turned ON. When the handover is performed, it is assumed that both of a base station for which flat-rate data communication can be performed and a base station for which flat-rate data communication is not allowed to be performed become a next connection candidate. In this case, it is desirable that the operation is controlled so that a base station is selected in the order of the same base station of the communications company to which the connection has been previously performed, then a base station for which flat-rate data communication can be performed, then a base station for which flat-rate data communication is not allowed to be performed.

Alternatively, in the regular connection and the handover, the operation maybe controlled in the order of (power ON), then search for a connection base station, then judgment of a connection destination from a plurality of base stations, then connection start, then processing of the present invention, then a state in which call and communication can be performed.

In addition, even in a conventional case in which electric field strength is merely strong, the present invention may be applied to a conventional base station the electric field strength of which is a certain value or more.

In addition, in the above-described embodiment, information on a communications company for which flat-rate communication can be performed is recorded to the SIM card 10 and read, and the information maybe held by the communications company itself instead of the SIM card. Alternatively, the information may be written to the main body of the portable telephone and may be recorded to an external recording medium such as an SD card.

In addition, in the above-described embodiment, on the assumption that a contract of flat-rate data communication is made, data communication is set to ON and OFF, however, at the time of international roaming, regardless of a contract of flat-rate data communication, data communication may be set to OFF in order to give priority to suppression of the communication charge.

According to the above-described implemented portable telephone, at the time of international roaming, a communication charge in a foreign country, which is relatively high, can be suppressed. It is conceivable that it is particularly highly effective for a portable telephone such as a smartphone in which undesirable communication that is not intended by the user occurs.

In addition, according to the above-described implemented portable telephone, in a case in which the portable telephone is used in the vicinity of a border between the countries, a communications company with which a contract is made provides service of roaming with a communications company of an adjacent country, connection to a roaming destination is unexpectedly performed. Even in such a case, the communication charge can be suppressed.

In addition, the embodiments are examples in which a portable telephone is applied as a terminal device, and the present invention is not limited to such examples. As long as equipment is compatible with international roaming service, for example, a smartphone, a personal computer in which a communication function is built, a tablet terminal in which a communication function is built, and other pieces of electronic equipment can be widely applied.

Hereinafter, the features of the present invention are noted supplementarily.

A part or all of the above-described embodiments can be described as, but not limited to, the following supplementary notes.

(Supplementary Note 1)

Figure 4:
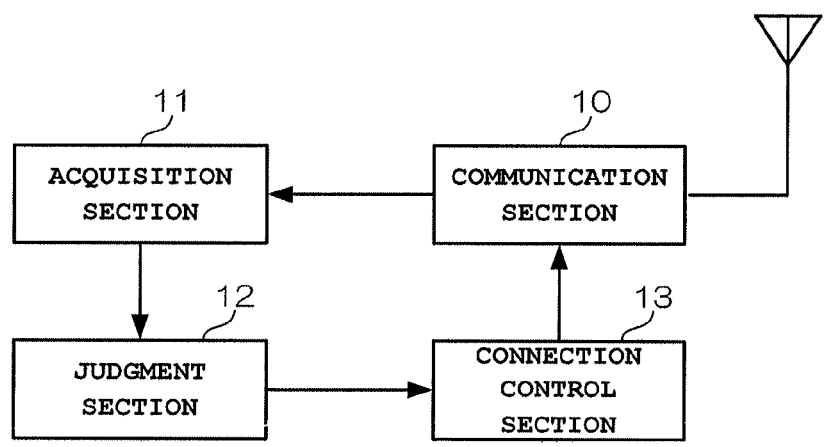
FIG. 4 is a configuration diagram of Supplementary Note 1.

FIG. 4 is a configuration diagram of Supplementary Note 7. As illustrated in FIG. 4, the invention described in Supplementary Note 1 is a portable telephone that can switch a communications company that is used for communication by a communication section 10 inside and outside a country, the portable telephone comprising:

an acquisition section 11 configured to acquire information on a communications company that can be connected at a time of connection to a base station;

a judgment section 12 configured to judge whether or not the communications company information that is acquired by the acquisition section 11 indicates a communications company for which flat-rate data communication can be performed; and a connection control section 13 configured to perform connection, by the, communication section 10, to the communications company that is indicated by the communications company information that is acquired by the acquisition section 11 and set that data communication can be performed when the judgment section 12 judges that the communications company information indicates the communications company for which flat-rate data communication can be performed, and perform connection, by the communication section 10, to the communications company that is indicated by the communications company information that is acquired by the acquisition section 11 and set that data communication is not allowed to be performed when the judgment section 12 judges that the communications company information does not indicate the communications company for which flat-rate data communication can be performed.

(Supplementary Note 2)

The portable telephone according to Supplementary Note 1 further comprising:

a data communication continuation setting section configured to set availability of data communication when connection to the communications company for which flat-rate data communication is not allowed to be performed is performed, wherein in a case in which connection to the communications company for which flat-rate data communication is not allowed to be performed is performed, the connection control section judges that data communication can be performed when the data communication is set to be allowed by the data communication continuation setting section, and judges that data communication is not allowed to be performed when the data communication is set not to be allowed by the data communication continuation setting section.

(Supplementary Note 3)

The portable telephone according to Supplementary Note 1 further comprising:

a storage section configured to store a list of at least communications companies with which the portable telephone that is prepared beforehand makes a contract and for which flat-rate data communication can be performed, wherein the judgment section judges whether or not the communications company information indicates a communications company for which flat-rate data communication can be performed, by referring to the list of the communications companies for which flat-rate data communication can be performed, which is stored in the storage section.

(Supplementary Note 4)

The portable telephone according to Supplementary Note 3, wherein the storage section is a SIM card that includes initial setting information of the portable telephone.

(Supplementary Note 5)

The portable telephone according to Supplementary Note 3, wherein the storage section is an external recording medium that can be attached and removed to and from the portable telephone.

(Supplementary Note 6)

A communication connection control method when a communications company that is used for communication by a communication section inside and outside a country is switched, the method comprising:

an acquisition step of acquiring information on a communications company that can be connected at a time of connection to a base station;

a judgment step of judging whether or not the acquired communications company information indicates a communications company for which flat-rate data communication can be performed; and a connection control step of performing connection, by the communication section, to the communications company that is indicated by the acquired communications company information and setting that data communication can be performed when it is judged that the communications company information indicates the communications company for which flat-rate data communication can be performed, in the judgment step, and performing connection, by the communication section, to the communications company that is indicated by the acquired communications company information and setting that data communication is not allowed to be performed when it is judged that the communications company information does not indicate the communications company for which flat-rate data communication can be performed, in the judgment step.

(Supplementary Note 7)

A non-transitory computer-readable storage medium having a program stored thereon that is executable by a computer of a portable telephone which switches a communications company that is used for communication by a communication section inside and outside a country to perform functions comprising:

an acquisition function to acquire information on a communications company that can be connected at a time of connection to a base station;

a judgment function to judge whether or not the acquired communications company information indicates a communications company for which flat-rate data communication can be performed; and a connection control function to perform connection, by the communication section, to the communications company that is indicated by the acquired communications company information and set that data communication can be performed when the judgment function judges that the communications company information indicates the communications company for which flat-rate data communication can be performed, and perform connection, by the communication section, to the communications company that is indicated by the communications company information that is acquired by the acquisition function and set that data communication is not allowed to be performed when the judgment function judges that the communications company information does not indicate the communications company for which flat-rate data communication can be performed.

Description of Reference Numerals

10 communication section
11 acquisition section
12 judgment section
13 connection control section

The invention claimed is:

1. A communication device comprising:
a communication section configured to communicate with a base station;
a storage section configured to store at least first communications company information on a first communications company that is under contract, second communications company information on a second communications company that is allowed to be connected and third communications company information on a third communications company for which flat-rate data communication is allowed to be performed;
an acquisition section configured to acquire communications company information on a communications company that is allowed to be connected at a time of connection to the base station;
a judgment section configured to judge whether or not the communications company information that is acquired by the acquisition section indicates the third communications company for which flat-rate data communication is allowed to be performed; and
a connection control section configured to perform connection, by the communication section, to the communications company that is indicated by the communications company information that is acquired by the acquisition section and set that data communication is allowed to be performed when the judgment section judges that the communications company information indicates the third communications company for which flat-rate data communication is allowed to be performed, and perform connection, by the communication section, to the communications company that is indicated by the communications company information that is acquired by the acquisition section and set that data communication is not allowed to be performed when the judgment section judges that the communications company information does not indicate the third communications company for which flat-rate data communication is allowed to be performed.

2. The communication device according to claim 1 further comprising:
a data communication continuation setting section configured to set availability of data communication when connection to the third communications company for which flat-rate data communication is not allowed to be performed is performed,
wherein in a case in which connection to the third communications company for which flat-rate data communication is not allowed is performed, the connection control section judges that data communication is allowed to be performed when the data communication is set to be allowed by the data communication continuation setting section, and judges that data communication is not allowed to be performed when the data communication is set not to be allowed by the data communication continuation setting section.

3. The communication device according to claim 1,
wherein the storage section further stores a list of at least the third communications companies with which the communication device that is prepared beforehand makes a contract and for which flat-rate data communication is allowed to be performed,
wherein the judgment section judges whether or not the communications company information indicates the third communications company for which flat-rate data communication is allowed to be performed, by referring to the list of the third communications companies for which flat-rate data communication is allowed to be performed, which is stored in the storage section.

4. The communication device according to claim 3, wherein the storage section is a SIM card that includes initial setting information of the communication device.

5. The communication device according to claim 3 wherein the storage section is an external recording medium that is allowed to be attached and removed to and from the communication device.

6. A communication connection control method comprising:
a communication step of communicating with a base station;
a storage step of storing at least first communications company information on a first communications company that is under contract, second communications company information on a second communications company that is allowed to be connected and third communications company information on a third communications company for which flat-rate data communication is allowed to be performed;
an acquisition step of acquiring communications company information on a communications company that is allowed to be connected at a time of connection to the base station;
a judgment step of judging whether or not the acquired communications company information indicates the third communications company for which flat-rate data communication is allowed to be performed; and
a connection control step of performing connection, by the communication section, to the communications company that is indicated by the acquired communications company information and setting that data communication is allowed to be performed when it is judged that the communications company information indicates the third communications company for which flat-rate data communication is allowed to be performed, in the judgment step, and performing connection, by the communication section, to the communications company that is indicated by the acquired communications company information and setting that data communication is not allowed to be performed when it is judged that the communications company information does not indicate the third communications company for which flat-rate data communication is allowed to be performed, in the judgment step.

7. A non-transitory computer-readable storage medium having a program stored thereon that is executable by a computer of a communication device to perform functions comprising:
a communication function to communicate with a base station;
a storage function to store at least first communications company information on a first communications company that is under contract, second communications company information on a second communications company that is allowed to be connected and third communications company information on a third communications company for which flat-rate data communication is allowed to be performed;
an acquisition function to acquire communications company information on a communications company that is allowed to be connected at a time of connection to the base station;
a judgment function to judge whether or not the acquired communications company information indicates the third communications company for which flat-rate data communication is allowed to be performed; and
a connection control function to perform connection, by the communication section, to the communications company that is indicated by the acquired communications company information and set that data communication is allowed to be performed when the judgment function judges that the communications company information indicates the third communications company for which flat-rate data communication is allowed to be performed, and perform connection, by the communication section, to the communications company that is indicated by the communications company information that is acquired by the acquisition function and set that data communication is not allowed to be performed when the judgment function judges that the communications company information does not indicate the third communications company for which flat-rate data communication is allowed to be performed.

* * * * *